United States Patent [19]
Darden

[11] Patent Number: 6,042,475
[45] Date of Patent: Mar. 28, 2000

[54] METHOD AND APPARATUS FOR CONTROLLING TEMPERATURE AND VENTILATION IN AN ANIMAL CONFINEMENT BUILDING

[76] Inventor: Lew G. Darden, 25 E. Darden Rd., Faison, N.C. 28341

[21] Appl. No.: 09/168,214

[22] Filed: Oct. 7, 1998

[51] Int. Cl.[7] ................................................. F24F 13/12
[52] U.S. Cl. ........................... 454/274; 160/202; 454/256
[58] Field of Search .................................... 454/256, 274; 119/437, 448; 160/202, 222, 223, 224

[56] References Cited

U.S. PATENT DOCUMENTS

| | | |
|---|---|---|
| 833,058 | 10/1906 | Kidd . |
| 1,126,864 | 2/1915 | Rankin . |
| 1,387,062 | 8/1921 | Marshall . |
| 1,446,188 | 2/1923 | Lang . |
| 1,989,391 | 1/1935 | Whittier . |
| 4,428,278 | 1/1984 | Sutton ...................................... 454/229 |
| 5,031,574 | 7/1991 | McDowell ............................... 119/160 |
| 5,492,082 | 2/1996 | Krevinghaus et al. .................. 119/448 |
| 5,549,150 | 8/1996 | Williams ............................. 160/202 X |
| 5,566,644 | 10/1996 | Berry ...................................... 119/448 |

Primary Examiner—Harold Joyce
Attorney, Agent, or Firm—Olive & Olive, P.A.

[57] ABSTRACT

A method and apparatus for controlling temperature and ventilation in an animal confinement building comprising a series of semi-rigid panels that are suspended in cascading arrangement along a flexible cable. The cable is connected to a mechanism for extending and retracting the cable so as to cause the panels to be lowered to open the aperture or raised to close the aperture according to sensed temperature and pressure conditions within the animal confinement building.

12 Claims, 3 Drawing Sheets

METHOD AND APPARATUS FOR CONTROLLING TEMPERATURE AND VENTILATION IN AN ANIMAL CONFINEMENT BUILDING

BACKGROUND OF THE INVENTION

1. Field of the Invention

This invention relates to method and apparatus for controlling temperature and ventilation in an animal confinement building, and more particularly to method and apparatus for opening and closing windows in such building to control temperature and ventilation therein.

2. Description of Related Art

Poultry, swine, and other livestock are typically confined in large buildings for a period of time to optimize the conditions for their growth and health. The confinement buildings are built to hold large numbers of animals, and the temperature inside the buildings and requirement for fresh air replenishment are critical concerns.

Systems to operate curtains for the control of airflow and temperature by varying the amount of ventilation have existed in various forms before the present invention was developed. The present invention represents an improvement over the existing systems. The known systems involve motorized devices that move a fabric curtain to open and close a window aperture of the animal confinement building according to the temperature or pressure within the building. The motor is controlled to move the curtain incrementally to adjust the ambient parameters gradually. Certain of the known systems, an example of which is disclosed in U.S. Pat. No. 5,566,644, include provisions to automatically open the curtain actuation device in case of a power failure. Another patent directed to this process is U.S. Pat. No. 5,085,368 in which the amount of electric power required to actuate the curtain system is reduced by the use of balancing counterweights.

In all the known apparatus and prior art, the wall aperture is covered by means of a curtain that is generally made of cloth that is coated on one or both sides for improved wind resistance. The curtain made of cloth material, whether coated or not, is susceptible to deterioration from weather exposure and damage due to scratching or chewing by rodents. Due to susceptibility to damage and rapid weather deterioration, curtains made of cloth material must be replaced every two to four years. Replacement of the curtains is a time consuming and expensive job, in terms of materials as well as labor.

Therefore, it is an object of the present invention to provide an apparatus for opening and closing a wall aperture that is substantially resistant to weather exposure and damage caused by rodents.

It is a further object of the present invention to provide an apparatus for opening and closing a wall aperture that is operable with existing mechanisms used for opening and closing known curtains.

It is another object of this invention to provide operating mechanism for positioning panels on the exterior of a wall between substantially opened and closed positions.

It is still another object of this invention to provide mechanism for automatically opening and closing a wall aperture by lowering and raising slats or panels.

It is yet another object of this invention to provide curtains for an animal confinement building formed of a durable material to resist damage by rodents and weather deterioration.

These and additional objects will become apparent through the description that follows.

SUMMARY OF THE INVENTION

The present invention is directed to a method and apparatus for controlling ventilation and temperature in an animal confinement building. A number of vertically disposed planar panels positioned on the exterior of the building are connected to each other in spaced relation along a flexible suspension cable. The panels are assembled in a cascaded series over an aperture in a wall of the building so that one panel will overlap another when they are drawn to open the wall aperture. When the panels are in the expanded position, each panel overlaps with a substantial portion of the next lower panel to form an unbroken closure. For strength and durability, the panels are made of a semi-rigid material.

BRIEF DESCRIPTION OF THE DRAWINGS

These and other aspects of the invention will become more apparent with reference to the description including the drawings, where.

DESCRIPTION OF THE PREFERRED EMBODIMENT OF THE INVENTION

Figure 1:
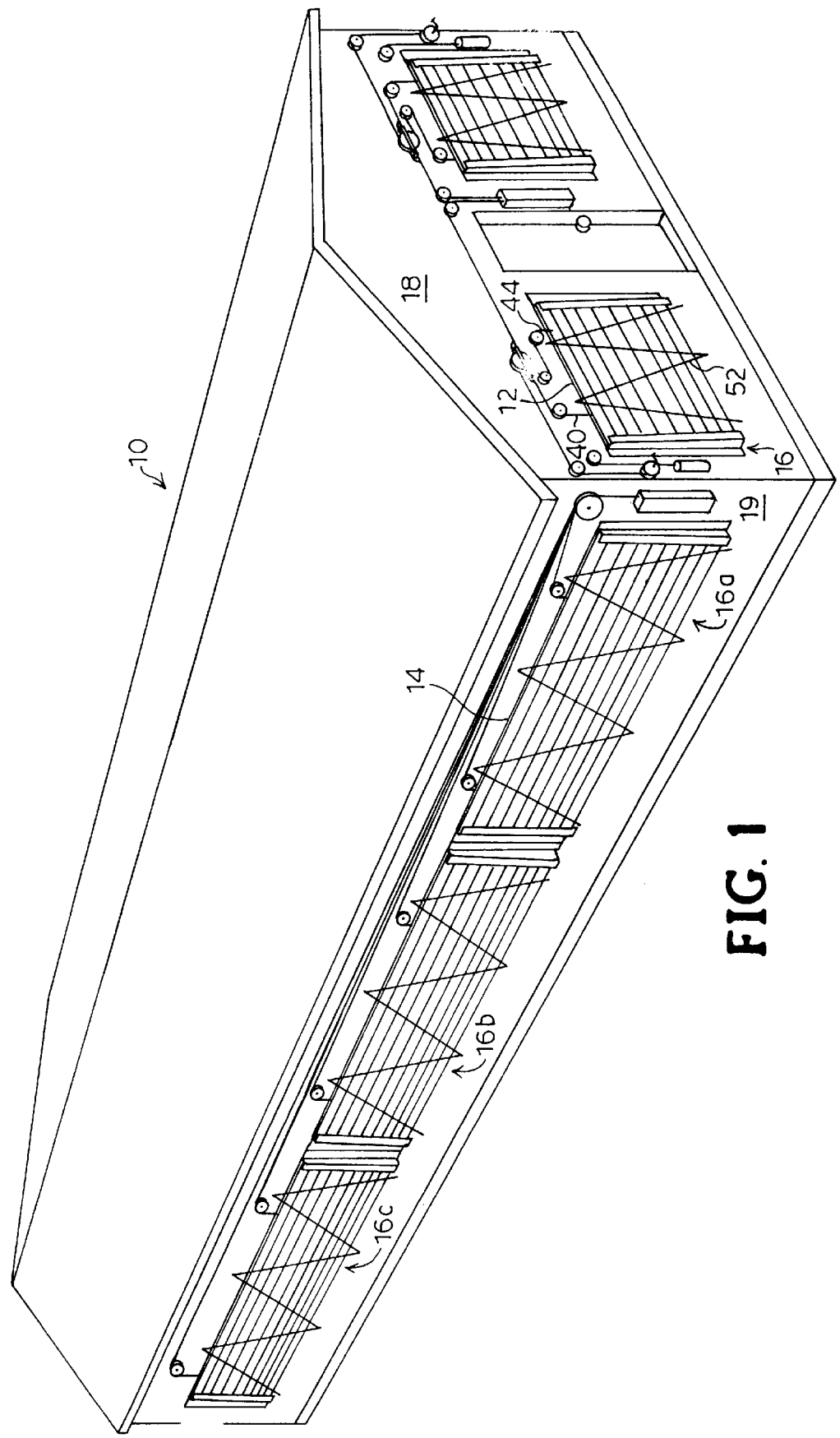
FIG. 1 is a perspective view of an embodiment of this invention with a plurality of aperture closure devices shown in substantially closed positions installed on exterior walls of an animal confinement building.

FIG. 1 is a perspective view of an embodiment of the invention illustrating an aperture closure 16 and a plurality of other aperture closures (closure 16a, 16b, and 16c) installed on the exterior of an end wall 18 and side wall 19 of an animal confinement building 10. It is understood that a substantially identical end wall and a substantially identical side wall opposite end wall 18 and side wall 19, respectively, are formed on opposite portions of the building and therefore are not shown in the drawing. Animal confinement building 10 is provided with an end wall window or aperture 12 formed in end wall 18, and a long continuous side wall window or aperture 14 formed in side wall 19. A rear end wall (not shown) in a position opposed to end wall 18 typically has no openings. Animal confinement building 10 further comprises aperture closure 16a, closure 16b and closure 16c substantially similar to closure 16.

Still referring to FIG. 1, while aperture closure 16 and closures 16a, 16b and 16c are mounted on the exterior of end wall 18 at different portions of animal confinement building 10, as will be explained in more detail in connection with the description of the configuration in FIG. 3, the elements and structure of each closure cooperate to perform substantially identical functions of closing and opening end wall aperture 12. Aperture closure 16a, closure 16b and closure 16c are mounted adjacent one another on the exterior of side wall 19. This invention contemplates that the dimensions of closures 16, 16a, 16b, and 16c may vary with the size of the particular aperture of an animal confinement building.

Figure 2:
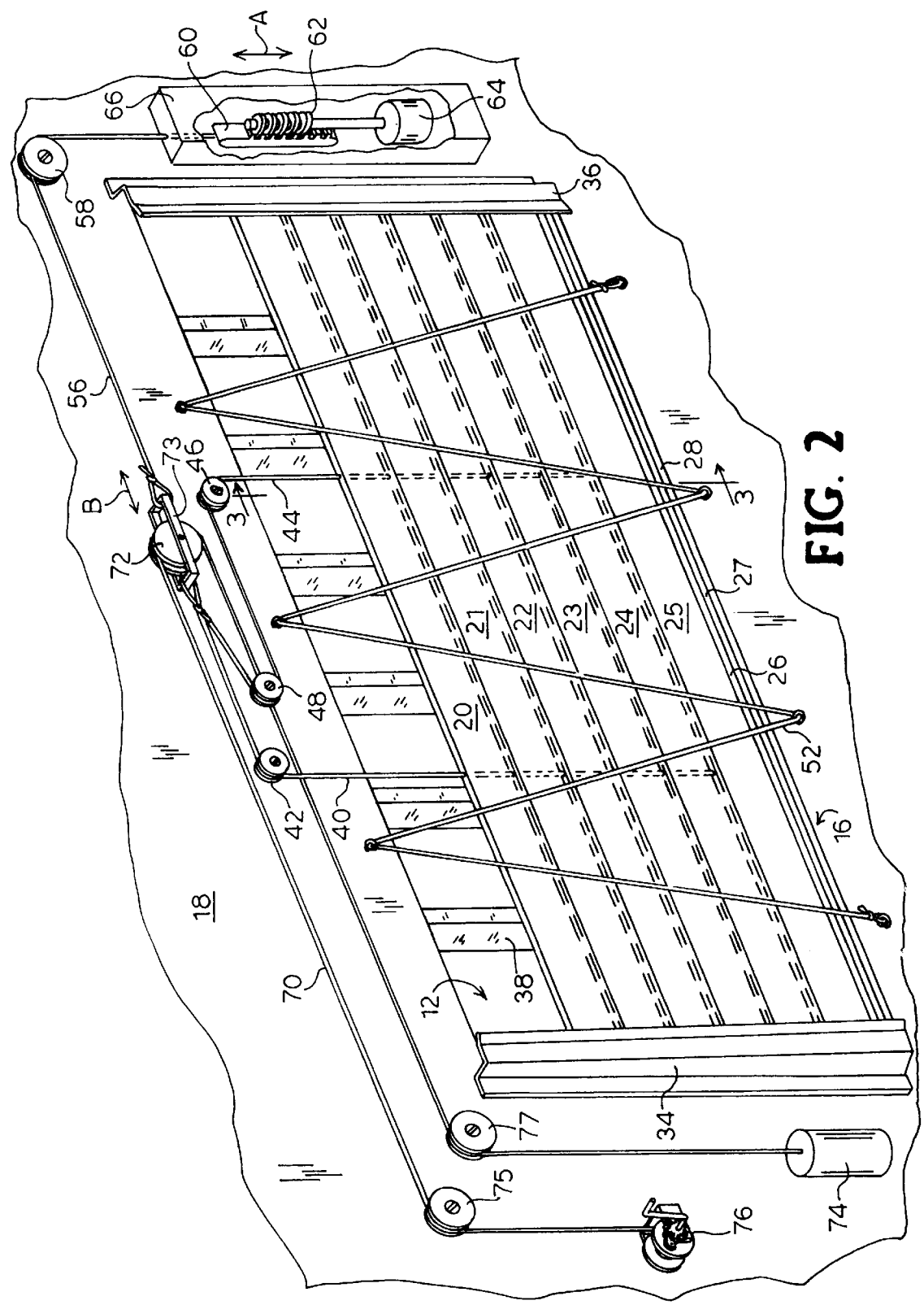
FIG. 2 is an enlarged fragmentary perspective view of another embodiment of the present invention with the aperture closure device shown in a partially closed condition installed on an exterior wall of an animal confinement building.

FIG. 2 shows a fragmentary perspective view of another embodiment of the invention illustrating aperture closure 16 in detail. Aperture closure 16 comprises panels 20 through 28, suspension members or left cable 40 and right cable 44, left track or retainer 34 and right track or retainer 36, and outer retainer 52. Aperture closure 16 is shown mounted on end wall 18 adjacent aperture 12. Left end retainer 34 and right end retainer 36 serve as a pair of panel guides mounted in vertical orientation to end wall 18 and are disposed on opposite sides of end wall aperture 12 in a manner to slidingly engage respective ends of each of semi-rigid panels 20 through 28. Left end retainer 34 and right end retainer 36 are mounted to end wall 18 by screws or other known suitable fastening means, not shown.

Still referring to FIG. 2, left end retainer 34 and right end retainer 36 are formed with a planar portion located substantially parallel to and spaced out from end wall 18. Left end retainer 34 and right end retainer 36 function to keep panels 20 through 28 from moving laterally or moving away from end wall 18. Retainers 34 and 36 are also positioned to allow panels 20 through 28 to slide up and down. Preferably, panels 20 through 28 are constructed substantially long in their lateral dimension and substantially short in their vertical dimension.

Panels 20 through 28 are capable of being moved into cascading alignment so that the lower edge of a panel, e.g. upper panel 20, overlaps the upper edge of an adjoining intermediate panel, e.g. panel 21. The remaining adjoining panels 22, 23, 24, 25, 26, and 27 are also positioned when moved into cascading alignment so that the lower edge of an upper panel overlaps the upper edge of an adjoining intermediate panel. The lower edge of panel 25 overlaps the upper edge of the adjoining lower panel 26. Similarly, the lower edge of panel 27 overlaps the upper edge of the adjoining lower panel 28. Each pair of adjacent panels of panels 20 through 28 similarly moves with the lower edge of the upper panel overlapping the upper edge of the lower panel. The panels 20 through 28 are positioned such that the inner surfaces contact a series of studs or building frame members 38. Frame member 38 forms a part of the structure for animal confinement building 10. The panels 20 through 28 are positioned such that the outer surfaces are maintained in contact with outer retainer 52, see FIG. 2. Panels 20 through 28 are also slidingly supported by left end retainer 34 and right end retainer 36. Preferably, outer retainer 52 is in the form of a cord or cable as best seen in FIG. 2. Building frame members 38 are typically construction lumber, e.g. 2×4 studs, and may have a mesh material (not shown) affixed in a manner to keep birds out of animal confinement building 10. Outer retainer 52 is mounted to end wall 18 with sufficiently close lateral spacing between adjacent sections thereof to provide reinforcement for panels 20 through 28 during conditions of relatively high wind velocity. The assembly comprising outer retainer 52, studs 38, left end retainer 34 and right end retainer 36 provides a four sided guide structure within which panels 20 through 28 can slide up and down.

Referring still to FIG. 2, the mechanism for lowering and raising panels 20 through 28 includes a linear motion device, such as motor 64 that is operative to drive worm gear 62 in either a clockwise or counterclockwise direction to cause rack 60 to raise or lower in a substantially vertical direction as shown by arrow A. As illustrated, when motor 64 rotates in a clockwise direction (as viewed from above), rack 60 will be raised and panels 20 through 28 will be lowered. Alternatively, when motor 64 rotates counterclockwise, rack 60 is lowered and panels 20 through 28 are raised. The motor device 64 is contained within a housing 66 (shown in partial broken-away view) for protection from weather, etc. Other devices for extending and retracting a flexible suspension member, such as a motor driven cable reel or a linear motor would be equally functional for the purpose of the present invention. Suspension member or cable 56 entrained on pulley 58, connects rack 60 to a yoke 73 assembled around pulley 72 so as to cause pulley 72 to move horizontally in a direction indicated by arrow B as rack 60 is lowered and raised. Suspension member or cable 70 is connected on a first end to manual winch 76 and on a second end to weight 74, and is entrained on pulley 72 therebetween. Pulleys 75 and 77 are mounted to wall 18 in locations to direct the path of cable 70 around the corner of aperture 16. The suspension member 70 typically might be any flexible member known in the art. Manual winch 76 provides a means to lower and raise panels 20 through 28 by hand in the event of a power failure. In normal operation, manual winch 76 is locked in a fixed position and the lowering and raising of rack 60 is controlled by the operation of motor 64. In normal operation with manual winch 76 locked, when motor 64 is caused to operate in a first direction, flexible member 56 causes pulley 72 to move to the right and weight 74 is raised. When motor 64 is caused to operate in a second or opposite direction, cable 56 causes pulley 72 to move to the left and weight 74 is lowered. Motor 64 is caused to operate in a clockwise or counterclockwise direction to respectively open or close panels 20 through 28 in response to signals generated by sensors (not shown). The sensors are utilized to trigger operation of the motor 64 when the temperature or static pressure in animal confinement building 10 is not within a preset selected range.

Still referring to FIG. 2, left cable 40 and right cable 44 with their associated left pulley 42 and right pulley 46, respectively, are arranged and positioned for lowering and raising panels 20 through 28.

Left cable 40 is connected at its lower end to the left end of each of panels 20 through 28 and is entrained on left pulley 42 in its middle portion. Left cable 40 is connected at its upper end to yoke 73 around pulley 72 so as to be extended or retracted by the horizontal movement of pulley 72. Right cable 44 is connected in a similar manner at its lower end to the right ends of panels 20 through 28. Right cable 44 is also connected at its upper end to the yoke portion 73 of pulley 72. Right cable 44 passes over right pulley 46 in a first direction and over reversing pulley 48 to reverse its direction and become aligned with left cable 40 at their mutual connection to yoke portion 73 of pulley 72. Left pulley 42, right pulley 46 and reversing pulley 48 are stationary, and only pulley 72 and yoke portion 73 are moveable. As pulley 72 and yoke portion 73 are moved to the right, left cable 40 and right cable 44 are retracted to lift panels 20 through 28. As pulley 72 is moved to the left, left cable 40 and right cable 44 are extended to lower panels 20 through 28. Alternate devices, such as curved cable guides or pivotally mounted levers may be used in place of left pulley 42, right pulley 46, and reversing pulley 48.

It will be appreciated that additional cables, while not shown, may be used to keep panels 20 through 28 level. Additional cables, for example, can be mounted to engage additional pulleys affixed to end wall 18 to lift or lower panels 20 through 28 in a manner similar to operation of left cable 40, right cable 44 and their associated pulley hardware and configuration.

Figure 3:
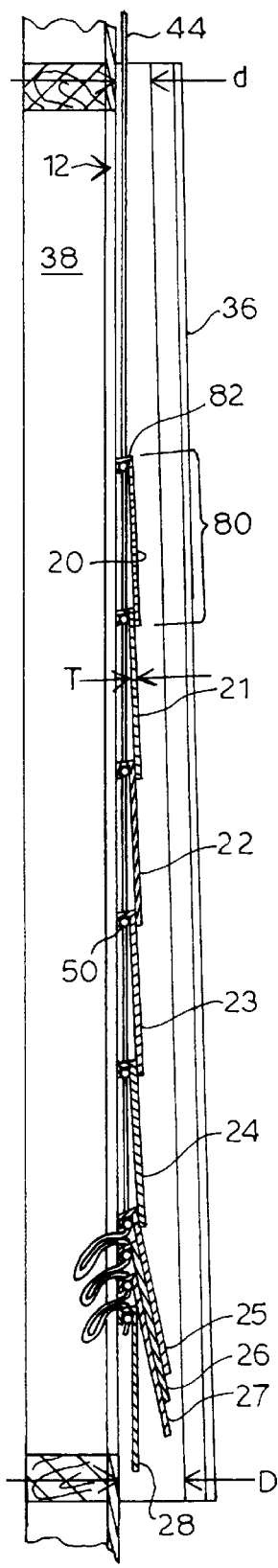
FIG. 3 is an enlarged cross sectional view of the apparatus shown in FIG. 2 and taken in the direction of line 3—3 of FIG. 2.
Figure 4:
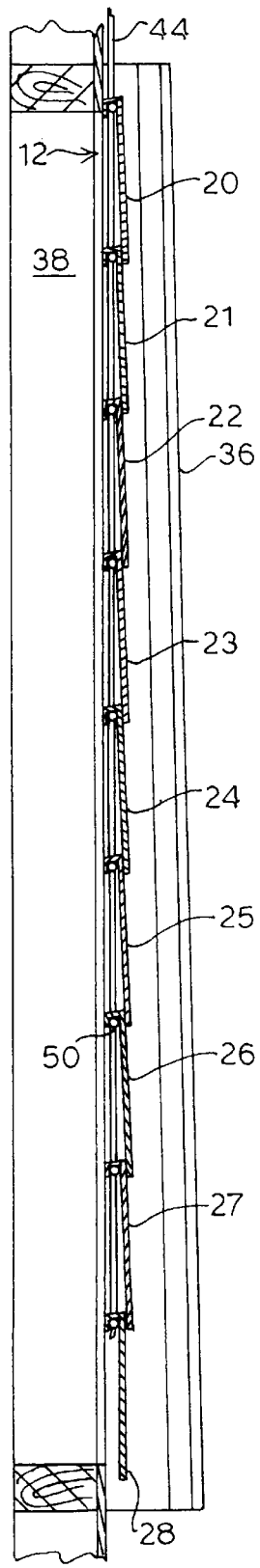
FIG. 4 is a cross sectional view of the apparatus of FIG. 3 with the aperture closure device in the completely closed position.
Figure 5:
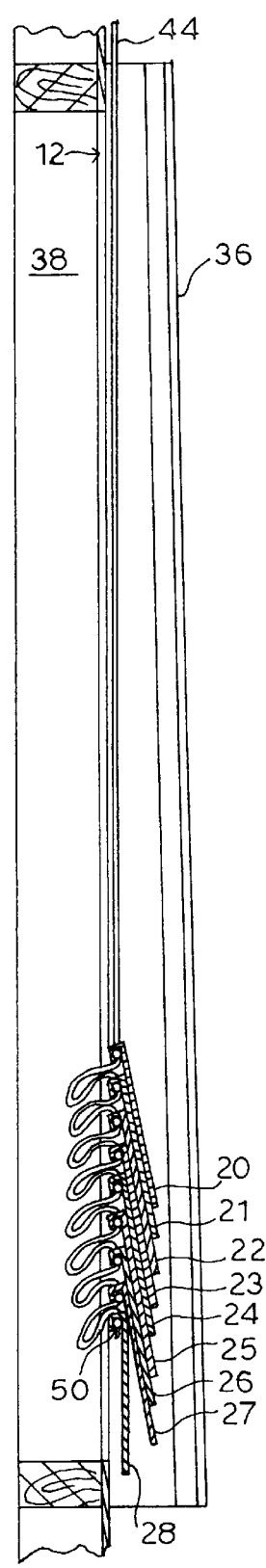
FIG. 5 is a cross sectional view of the apparatus of FIG. 3 with the aperture closure device shown in the completely open position.

Referring now to FIG. 3, FIG. 4 and FIG. 5, panels 20 through 28 and associated elements are shown in cross section in a partially open, fully closed, and fully open positions. FIG. 3 illustrates panels 20 through 28 in a partially open position corresponding with the arrangement of panels as shown in FIG. 2. In this position, the end wall aperture 12 is partially exposed at its upper portion. Panels 20 through 28 are suspended for vertical movement by right cable 44. Panels 20 through 28 are affixed to right cable 44 and mounted such that each panel is maintained in a spaced relation from adjacent panels by a clamp 50. Clamp 50 typically is in the form of a compression type clamp that is affixed to right cable 44 by a crimping tool or set screw. Alternatively, clamp 50 may take the form of a knot made in right cable 44, or with other known clamping means. As right cable 44 is extended, or lowered by rack 60 (see FIG. 2) moving upwardly, panel 27 drops to a position overlapping panel 28, with other panels 26, 25, 24, 23, 22, 21, and 20 following in sequence to terminate with panels 20 through 28 at the fully lowered and overlapping position and the aperture 12 completely exposed as shown in FIG. 5.

Referring again to FIG. 3, each panel of panels 20 through 28 is formed with a cross section having a vertical planar surface 80 and a horizontal lip section 82 formed perpendicularly thereto. Lip section 82 provides increased longitudinal stiffness for each of the panels 20 through 28 and also provides a horizontal attachment surface for right cable 44 so that right cable 44 can maintain its general verticality. As seen in FIG. 3 and FIG. 5, right cable 44 will naturally form loops of slack cable between successive panels as panels 20 through 28 are lowered and wall aperture 12 is opened.

In accordance with a preferred embodiment of the invention, vertical planar surface 80 of each of panels 20 through 28 is approximately 20.3 cm (8 inches) high. Lip section 82 is approximately 2.5 cm (1 inch) wide. Each panel of panels 20 through 28 has a thickness "T" of approximately 0.8 mm (0.032 inch), and a lateral length of 3 m (9.8 ft.). An available semi-rigid panel material that is recognized to satisfy the objectives of the present invention is polyvinylchloride (PVC) siding used for building structures. It will be appreciated that panels 20 through 28 may be formed of other semi-rigid materials, such as, for example, aluminum, with thickness "T" adjusted accordingly. It is also appreciated that panels 20 through 28 may be formed to provide greater rigidity, restricted only by the practical considerations of weight and cost. Either PVC or aluminum would afford substantial resistance to weather and rodent damage as compared to cloth. In the case of PVC or aluminum, the additional benefit and advantage of opacity to reduce the heating of the interior of the building by solar radiation is achieved. It is further appreciated that in certain climates, and especially with northern exposures, the panels 20 through 28 may consist of a panel formed of a light-transmissive material that would take advantage of the warming effect of the sun and reduce the need for artificial lighting.

Referring now to FIG. 4, panels 20 through 28 are shown in a fully closed position with right cable 44 substantially taut and panels 20 through 28 spaced apart. FIG. 3 shows aperture closure 16 in a partly open position with right cable 44 somewhat lowered. In FIG. 5, panels 20–28 are shown in the fully open position with right cable 44 essentially relaxed. The accumulated thickness created by all panels 20 through 28 being overlapped at the lowest position (see FIG. 5) is accommodated by track or right end retainer 36 being farther from studs or frame members 38 at its lower end than it is at its upper end, as seen in the difference between narrow upper space d and wider lower space D (see FIG. 3).

In operation, the present invention entails a method for opening and closing an opening in a wall of an animal confinement building. The method includes the steps of assembling a plurality of elongate rectangular panels to a first cable so that the panels are arranged in a spaced apart relation thereon and providing a second cable to move the panels in a spaced relation such that a bottom edge of a higher panel overlaps a top edge of a lower panel. Means are provided for suspending the first cable and the second cable in a manner so that the panels are located on building walls adjacent apertures for closing and opening the apertures. In one example, the first cable and second cable are extended to sequentially lower the panels and open the aperture. In another example, the first cable and second cable are retracted to sequentially raise the panels and close the aperture. A pair of tracks is provided for guiding the panels in vertical orientation adjacent the opening in the wall of an animal confinement building. The tracks are adapted to slideably contact each of the panels. A motor is operated to move the cables in response to a signal received from environment sensors, not shown, triggered when the temperature or static pressure condition of the building is within a prescribed range.

While the invention has been described with reference to a specific preferred embodiment thereof, it will be appreciated that numerous variations, modifications, and enhancements are possible and are therefore regarded as being within the spirit and scope of the invention that is only limited by the claims to follow.

What is claimed is:

1. Apparatus for controlling temperature and ventilation in an animal confinement building, comprising:
    (a) a plurality of semi-rigid elongate panels, each of said panels having a planar surface disposed substantially vertically with a top edge and a bottom edge thereof extending substantially horizontally;
    (b) a flexible suspension member connected at spaced apart intervals to said top edge of each of said panels so that said panels reside in cascaded relation with a bottom edge of a first of said panels overlapping a top edge of a second of said panels when said suspension member is retracted upwardly;
    (c) means for extending and retracting said suspension member adjacent an aperture formed through a wall of said building and operative for alternately extending said suspension member downwardly to lower said panels and retracting said suspension member upwardly to raise said panels; and
    (d) a retainer mounted parallel to said wall adjacent said aperture and adapted to slideably contact said panels.

2. The apparatus as described in claim 1, wherein said suspension member comprises a cable.

3. The apparatus as described in claim 1, wherein said means for extending and retracting said suspension member comprises a linear motion device.

4. The apparatus as described in claim 1 further comprising one or more pulleys connected to said wall above said aperture so as to engage said suspension member.

5. The apparatus as described in claim 1, wherein said panels are formed with a lip portion extending at an angle from said planar surface.

6. The apparatus as described in claim 5, wherein said lip portion is disposed at said top edge.

7. An animal confinement building adapted to provide a temperature and ventilation controlled environment for animals confined therein, comprising:

(a) a plurality of walls connected to one another and supporting a roof;

(b) said walls are formed with at least one aperture passing therethrough;

(c) means for opening and closing said at least one aperture, said means for opening and closing said aperture comprising a plurality of semi-rigid elongate panels each having a planar surface disposed substantially vertically with a top edge and a bottom edge extending substantially horizontally;

(d) a pulley connected to at least one of said plurality of walls above said at least one aperture;

(e) a suspension member engaging said pulley and carried thereby so as to be extended downwardly and retracted upwardly, said top edge of each of said panels being connected to said suspension member so that said panels reside in spaced apart parallel relation when said suspension means is retracted upwardly wherein a bottom edge of a first of said panels overlaps a top edge of a second of said panels;

(f) a track mounted to at least one of said walls in vertical orientation adjacent said wall aperture and adapted to slideably engage each panel of said plurality of elongate panels; and;

(g) a linear motion device connected for retracting and extending said suspension member in response to signals received from sensors able to sense and evaluate a selected condition within said animal confinement building.

8. The apparatus as described in claim 7, wherein said suspension member comprises a flexible cable.

9. A method for opening and closing an aperture in a wall of an animal confinement building, comprising the steps of:

(a) assembling a plurality of elongate rectangular panels to a first cable and a second cable in spaced relation so that a bottom edge of a higher panel overlaps a top edge of a lower panel;

(b) suspending said first cable and said second cable in a manner so that said panels are located for closing and opening said aperture;

(c) extending said first cable and said second cable; and (d) lowering sequentially said panels.

10. The method according to claim 9 further comprising the step of opening said aperture to a partially closed position.

11. A method for opening and closing an aperture in a wall of an animal confinement building, comprising the steps of:

(a) assembling a plurality of elongate rectangular panels to a first cable and a second cable in spaced relation so that a bottom edge of a higher panel overlaps a top edge of lower panel;

(b) suspending said first cable and said second cable in a manner so that said panels are located for closing and opening said aperture;

(c) retracting said first cable and said second; and (d) raising sequentially said panels.

12. The method of claim 11 further comprising the step of closing said aperture to a completely closed position.

* * * * *